United States Patent [19]

Miyadera et al.

[11] Patent Number: 5,070,409
[45] Date of Patent: Dec. 3, 1991

[54] LIQUID CRYSTAL DISPLAY DEVICE WITH DISPLAY HOLDING DEVICE

[75] Inventors: Shunichi Miyadera, Tokyo; Harumi Aoki, Saitama, both of Japan

[73] Assignee: Asahi Kogaku Kogyo Kabushiki Kaisha, Tokyo, Japan

[21] Appl. No.: 536,779

[22] Filed: Jun. 12, 1990

[30] Foreign Application Priority Data

Jun. 13, 1989 [JP] Japan .................. 1-151006

[51] Int. Cl.⁵ .................. H04N 3/14; H04N 5/70
[52] U.S. Cl. .................. 358/241; 358/212
[58] Field of Search .................. 358/236, 241, 212; 350/500

[56] References Cited

U.S. PATENT DOCUMENTS

| | | | |
|---|---|---|---|
| 3,723,651 | 3/1973 | Gorog | 358/236 |
| 4,523,232 | 6/1985 | Kameda et al. | 358/236 |
| 4,574,315 | 3/1986 | Yoshimura | 358/241 |
| 4,581,654 | 4/1986 | Kobayashi et al. | 358/241 |
| 4,746,988 | 5/1988 | Nutting et al. | 358/909 |
| 4,748,510 | 5/1988 | Umezawa | 358/241 |
| 4,837,628 | 6/1989 | Sasaki | 358/906 |
| 4,873,580 | 10/1989 | Katoh et al. | 358/150 |

FOREIGN PATENT DOCUMENTS 0278038 8/1988 European Pat. Off. .
62-242475 10/1987 Japan .
2061589 5/1981 United Kingdom .

OTHER PUBLICATIONS

Fujix Rec/Player R3000 Manual, (How to Record).
Abstract of Japanese Patent No. 62-242475.

Primary Examiner—James J. Groody
Assistant Examiner—Jeffrey S. Murrell
Attorney, Agent, or Firm—Sandler, Greenblum, & Bernstein

[57] ABSTRACT

A liquid crystal display device is provided for receiving a video signal and displaying a visual image. The display device employs an active matrix liquid crystal display member having a plurality of display elements, and a plurality of switching elements, respectively. An image signal included in the video signal is applied to the display elements in accordance with a horizontal synchronous signal. The signal corresponding to the synchronous signal included in the video signal to be applied to the switching elements is inhibited for a predetermined period of time so that the image is kept displayed by the display elements for a certain period of time without the need to supply another video signal.

12 Claims, 5 Drawing Sheets

LIQUID CRYSTAL DISPLAY DEVICE WITH DISPLAY HOLDING DEVICE

BACKGROUND OF THE INVENTION

The present invention relates to an active matrix liquid crystal display (LCD), and more particularly to a video signal recording/regenerating device, such as an electronic still camera and the like, employing a liquid crystal display as a monitor.

Recently, liquid crystal displays are being used as monitors in video signal recording/regenerating devices, making for a compact and relatively small power consumption device. Among the various types of liquid crystal displays, active matrix type displays having display elements and switching elements are becoming more and more prevalent, because displays employing other methods such as a direct multiplexing method are hardly capable of providing high-density display. In the active matrix type display, display elements are selectively driven by selectively turning ON corresponding switching elements.

Figure 1:
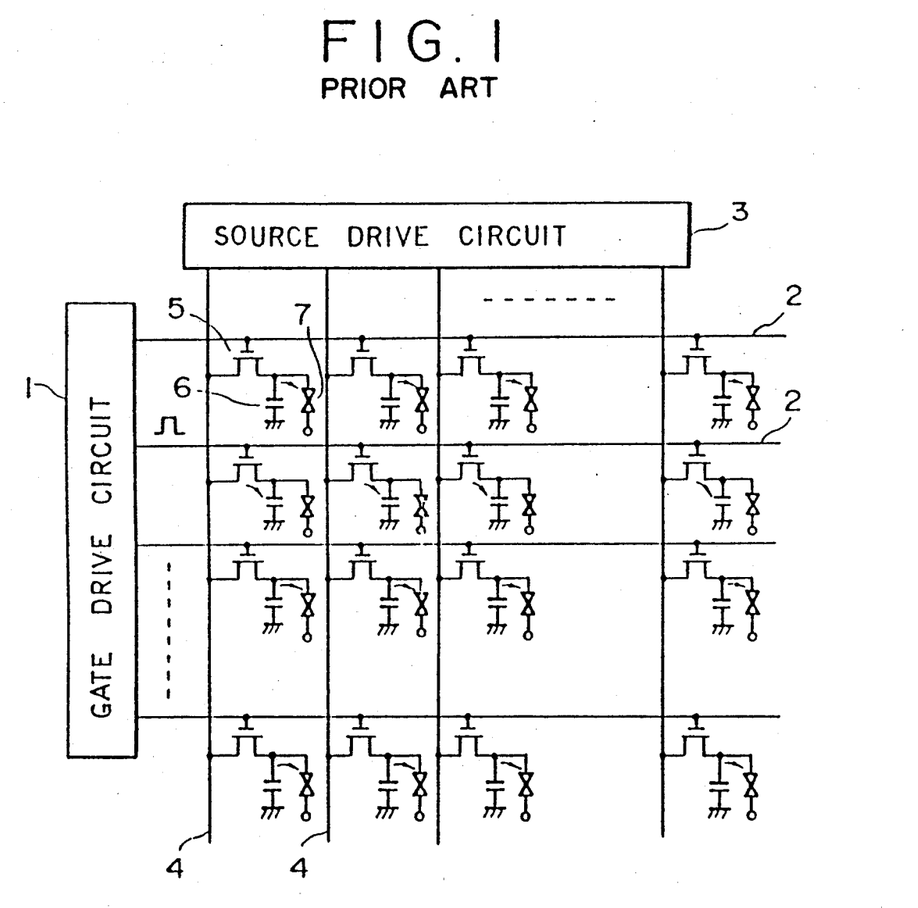
FIG. 1 is a circuit diagram illustrating the principle of a conventional liquid crystal display.

FIG. 1 is a circuit diagram illustrating an example of a conventional thin film transistor (TFT) active matrix LCD.

As shown in FIG. 1, a gate drive circuit 1 supplies switching pulses to a predetermined number of gate buses 2, whereas a source drive circuit 3 applies video signals to a predetermined number of corresponding source buses 4.

At each position of the matrix a thin film transistor (TFT) 5 functions as a switching element. A capacitor 6 accumulates the signal connected to each drain of the TFT's 5, and a display element 7, having transparent electrodes and liquid crystal layers respectively, are disposed at each position.

The operation will now be described with reference to a timing chart of FIG. 2.

The gate drive circuit 1 supplies switching pulses to the corresponding gate buses 2 being synchronized with horizontal synchronous signals included in the video signals.

Figure 2A:
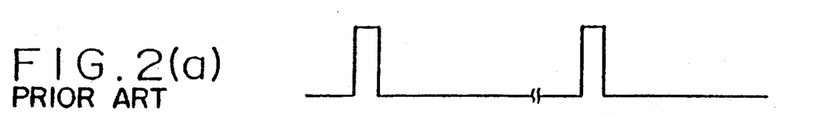
Figure 2B:
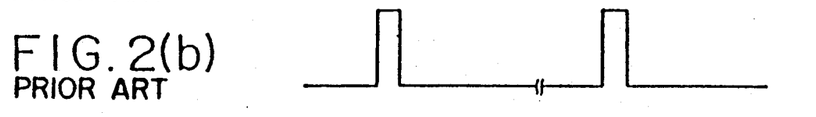

Suppose a switching pulse (FIG. 2(a)) is supplied to a gate bus 2 of the i-th line with the predetermined timing synchronized with the horizontal synchronous signal, and a switching pulse (FIG. 2(b)) is supplied to the gate bus 2 of the (i+1)-th line as with the timing of the horizontal synchronous signal approximately one field later in the case of interlaced scanning on one field basis. Note that in the case of line sequential scanning, the interval between adjacent switching pulses of the ith and the (i+1)th gate buses respectively equals one horizontal scanning period. The TFT's 5 connected to the gate bus 2 to which the switching pulse has been supplied are thus turned ON.

The source drive circuit 3 divides the received video signal into a multiplicity signals corresponding to a number of horizontal scanning lines these signals are synchronized with the horizontal synchronous signal included in the video signal. These video signals are accumulated in each of the capacitors 6 via the source and drain of the each TFT 5 and delivered to each display element 7 for display.

The signals accumulated in the capacitors 6 are held until a switching pulse is again supplied, after a lapse of time corresponding to the period of one frame. It should be noted that if the capacity of the liquid crystal and the resistance ratio $R_{off}/R_{on}$ (wherein $R_{off}$ is the internal resistance of the TFT 5 when it is in an OFF condition and $R_{on}$ is the internal resistance when it is in an ON condition) of the TFT 5 are sufficiently larger, the capacitor 6 can be omitted.

Figure 2C:
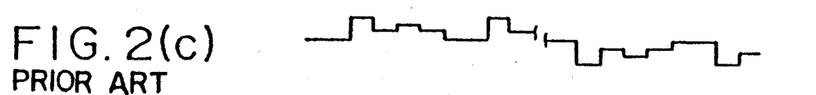
Figure 2D:
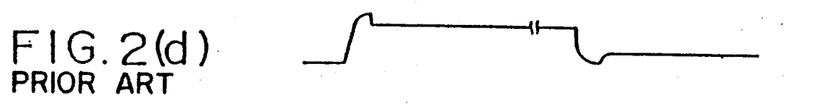

When the switching pulse is supplied to the gate bus 2 of the i-th line, the video signal (FIG. 2(c)) applied to the source bus 4 of the j-th column, is sampled and held in capacitor 6 as shown in FIG. 2(d).

Figure 2E:
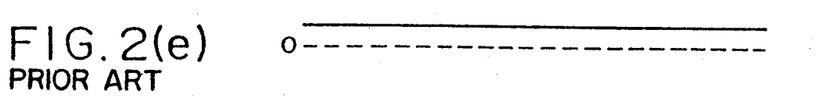
Figure 2F:
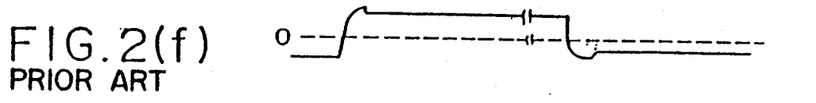

If the potential shown in FIG. 2(e) has been supplied to the reference terminal of the capacitor 6, the voltage shown in FIG. 2(f) is applied to the display element 7.

It should be noted that since the charges accumulated by the capacitors 6 are in accordance with the preceding input image signal (FIG. 2(f)), the succeeding image signal is applied to each display elements 7 in reversed polarity. That is, the image signal is applied to each source bus 4 through the source drive circuit 3 as an alternating current. An interval between the image signals applied to each of display elements 7 corresponds to the period for one frame in an interlaced scanning method; or one field in a line sequential scanning method.

In this way, a video signal corresponding to each pixel is supplied so that a whole image is displayed.

In the case of an electronic still camera or the like, for instance, such a liquid crystal display can be used to confirm an image to be photographed to view a recording of a video signal of the image on a magnetic disk.

Moreover, the liquid crystal display can be used to monitor the image by regenerating the video signal from the magnetic disk.

As set forth above, when a video signal is supplied to a conventional liquid crystal display, the display functions to show an image for only a period of time that corresponds to one frame. This permits the display to indicate multiple frames, thus simulating animation (or motion) of an image. Accordingly, in order for a conventional liquid crystal display device to display a still image, a frame member (or field memory) has to be used to store a video signal equivalent to one frame (or field) and then apply the video signal to the liquid crystal display for display by repeatedly reading the stored signals or repeatedly regenerating the signals recorded on the magnetic disk.

As a result, expensive memory is required to regenerate a still image and the disadvantage is that the generation of the still image tends to become costly.

To obtain the still image by regenerating the video signal from the magnetic disk is also disadvantageous in that a battery, a magnetic head or disk, or the like is quickly consumed.

SUMMARY OF THE INVENTION

To overcome the above disadvantages, it is therefore an object of the present invention to provide a low cost, simple construction liquid crystal display that is capable of displaying a still image.

Another object of the present invention is to provide a video signal processing device that is capable of confirming a recording image immediately after it has been recorded, and monitoring the recorded image by regenerating the recorded video signal while minimizing the power consumption of the device.

According to one aspect of the invention, there is provided a liquid crystal display device that receives a video signal and displays a visual image, comprising:

an active matrix liquid crystal display member having a plurality of display elements with a plurality of switching elements, respectively;

means for supplying drive signals to the display elements through respective switching elements based upon the video signal;

control means for keeping the switching elements in an OFF condition for a predetermined period of time so that the supply of the drive signal to the display elements is interrupted, whereby a still image is displayed for the predetermined period of time without applying another video signal to the display member.

According to another aspect of the invention, there is provided a video signal processing device, comprising:

means for photographing an object and converting the image of the object into a video signal having an image signal, a horizontal synchronous signal, and a vertical synchronous signal;

an active matrix liquid crystal display member having a plurality of display elements with a plurality of switching elements, respectively;

means for supplying drive signals to the display elements through the respective switching elements based upon video signal;

control means for keeping the switching elements in an OFF condition for a predetermined period of time so that the supply of the drive signal to the display elements is interrupted, whereby the visual still image is displayed for the predetermined period of time without applying another video signal to the display member.

DESCRIPTION OF THE ACCOMPANYING DRAWINGS

FIG. 2(a)-2(f) are timing charts illustrating the operation of the display shown in FIG. 1;

FIGS. 4(a)-4(f) are timing charts illustrating the operation of the display device embodying the present invention;

FIGS. 6(a)-6(f) are timing charts illustrating the operation of a display used in the device shown in FIG. 5.

DESCRIPTION OF AN EMBODIMENT

Figure 3:
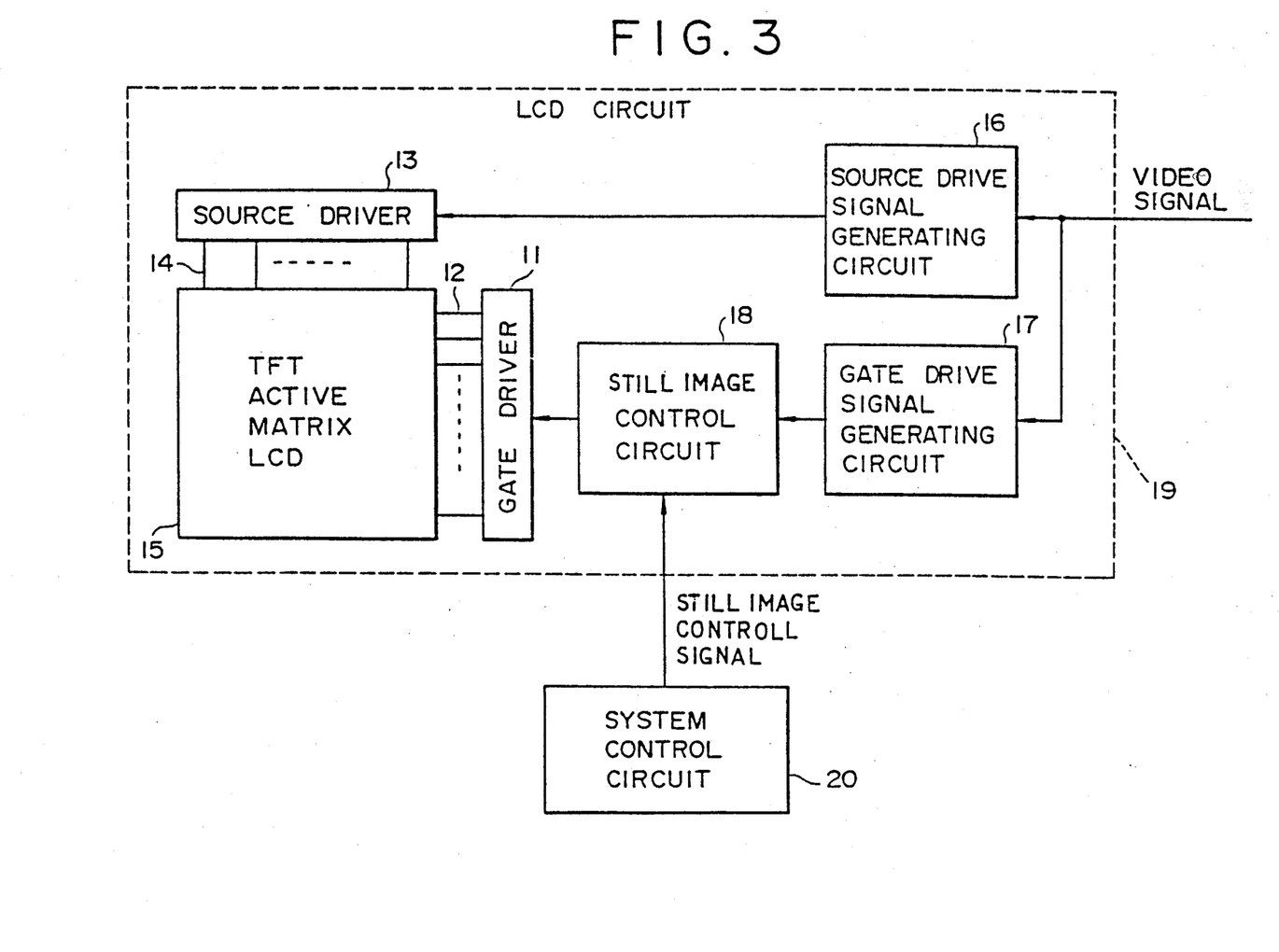
FIG. 3 is a block diagram illustrating the configuration of a liquid crystal display embodying the present invention.

FIG. 3 is a block diagram illustrating the configuration of a liquid crystal display embodying the present invention.

In FIG. 3, a gate driver 11 supplies switching pulses to a predetermined number of gate buses 12, while a source driver 13 supplies video signals to a predetermined number of source buses 14. A TFT active matrix LCD 15 is driven by the gate driver 11 and the source driver 13.

The aforementioned arrangement of the TFT active matrix liquid crystal display 15 is similar to what is shown in FIG. 1.

An LCD circuit 19 operates as follows.

Upon receiving the video signal, a source drive signal generating circuit 16 generates a source drive signal and supplies the signal to the source driver 13. Upon receiving the video signal, a gate drive signal generating circuit 17 generates a gate drive signal. A still image control circuit 18 causes the gate drive signal to be intermittently supplied from the gate drive signal generating circuit 17 to the gate driver 11.

A system control circuit 20 controls the operation of the LCD circuit 19, which will be described with reference to a timing chart shown in FIGS. 4(a) -4(f).

Upon receiving the video signal, the source drive signal generating circuit 16 generates the source drive signal and applies it to the source driver 13. The source driver 13 applies the source drive signal (including an image signal) via the corresponding source bus 14 to the source of the TFT 5 of the TFT active matrix LCD 15.

On the other hand, the gate drive signal generating circuit 17 generates the gate drive signal synchronously with the horizontal synchronous signal included in the video signal. The gate drive signal is applied via the still image control circuit 18 to the gate driver 11. The gate driver 11 supplies the switching pulse to each gate bus 12 in accordance with the gate drive signal. The switching pulse is supplied to the gate of the TFT 5 to turn ON and OFF the TFT 5.

In this way, an image corresponding to the video signal is displayed on the TFT active matrix LCD 15.

When a still image control signal is applied by the system control circuit 20, the still image control circuit 18 stops supplying the gate drive signal from the gate drive signal generating circuit 17 to the gate driver 11.

Figure 4A:
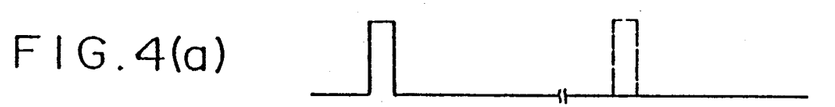
Figure 4B:
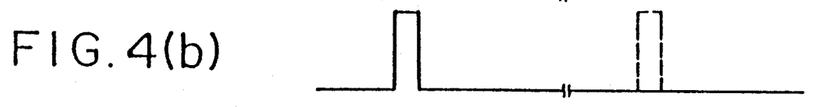

As shown in FIGS. 4(a) and 4(b), the switching pulses supplied to the gate buses 12 of the i-th and (i+2)-th lines (i-th and (i+1)-th lines in the case of line sequential scanning) are inhibited from being supplied after the generation of the still image control signal.

Figure 4C:
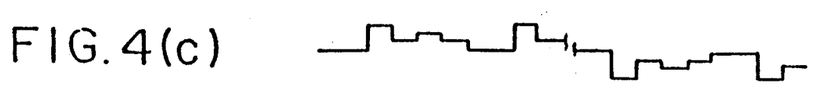
Figure 4D:
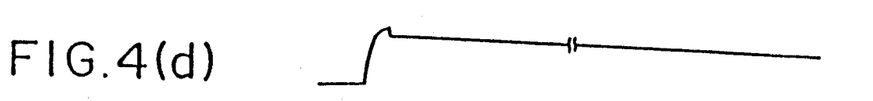

When the video signal, shown in FIG. 4(c), has been applied to the source bus 14 of the j-th row, the voltage sampled and held in the TFT 5 and capacitor 6 that has been electrically connected to the source bus 14 of the j-th row is kept held thereafter, as shown in FIG. 4(d).

Figure 4E:
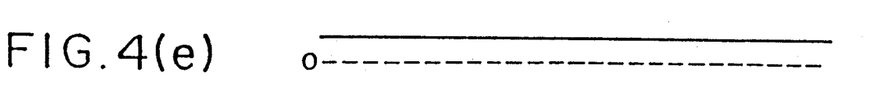
Figure 4F:
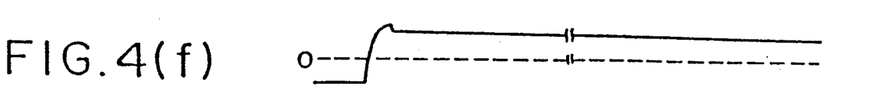

While the signal shown in FIG. 4(e) is being supplied to a reference terminal of the capacitor 6, the signal shown in FIG. 4(f) is applied to the corresponding display element 7. As no switching pulse is supplied to the gate bus 12, the voltage is kept constant. A still image is thereby displayed on the TFT active matrix LCD 15.

The supply of the switching pulse from the gate drive signal generating circuit 17 to the gate drive 11 is inhibited for a certain period of time (e.g., several seconds) which is sufficient to confirm the still image.

Actually, the charge upon capacitor 6 is spontaneously discharged via the OFF resistance of the TFT 5 with the holding of the image on the liquid crystal displaying element 7. Experiments show that a still image becomes obtainable for approximately 10 seconds by interrupting the supply of the switching pulse.

Figure 5:
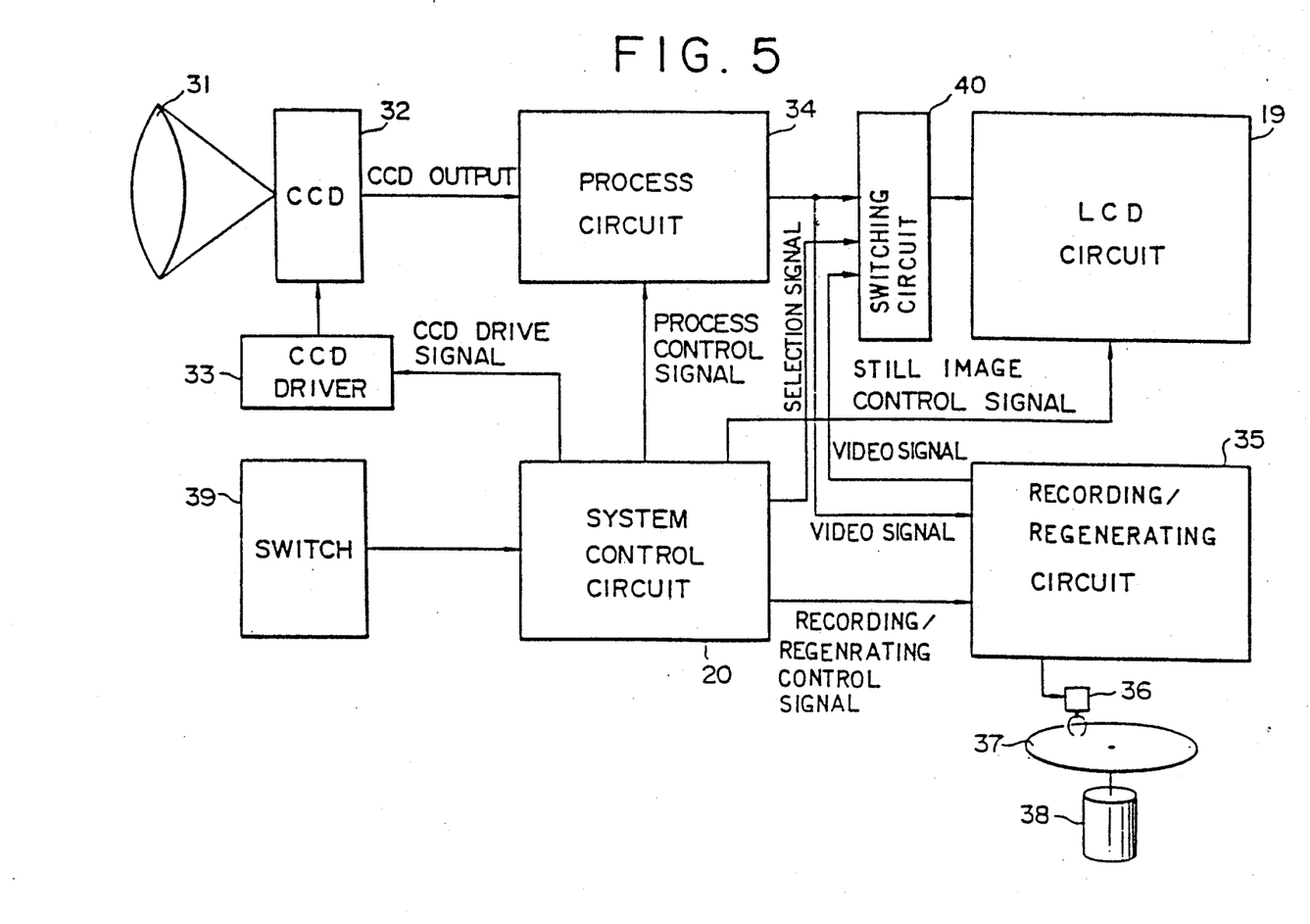
FIG. 5 is a block diagram illustrating the configuration of a video signal recording/regenerating device embodying the present invention.

FIG. 5 is a block diagram illustrating an arrangement of an electric still camera employing a liquid crystal display device embodying the present invention. The elements similar to those in FIG. 1 are given the same reference characters as in FIG. 1.

As shown in FIG. 5, when an object (not shown) is photographed, a photographic lens 31 causes light deriving from the object to be incident on a CCD 32. A CCD driver 33 electrically drives the CCD 32. A process circuit 34 processes the output of the CCD 32 and supplies the processed video signal to an LCD circuit 19 and a recording/regenerating circuit 35, based upon a process control signal. In this case, a switching circuit 40 is switched so that the process circuit 34 and the LCD circuit 19 are electrically connected upon a selection signal from the system control circuit 20.

A magnetic head 36 records the video signal on a recording medium such as a magnetic disk 37, that's rotated by a spindle motor 38. An operating switch 39, such as a release switch is operated when an object is photographed.

On the other hand, when the video signal is regenerated from the magnetic disk 37, the system control circuit 20 outputs a selection signal to the switching circuit 40 so that the output of the recording/regenerating circuit 35 is supplied to the LCD circuit 19. In this case, the magnetic head 36 regenerates the video signal from the magnetic disk 37, and the recording-/regenerating circuit 35 transmits the regenerated video signal to the LCD circuit 19 in accordance with the recording/regenerating signal from the system control circuit 20.

The operation of the circuit in FIG. 5 will now be described with reference to FIGS. 6(a)-6(f).

While the photographic lens 31 causes an image of the photographing object to be formed on the CCD 32, the CCD 32 is electrically driven by the CCD driver 33. The system control circuit 20 receives a CCD drive signal from the CCD driver 33 and applies a photoelectric conversion signal to the process circuit 34. The process circuit 34 processes the received signal and converts it into a video signal having a certain format, such as an NTSC (National Television System Committee) format. The video signal is applied to the LCD circuit 19 and displayed, as stated above.

When the operating switch 39 is operated at a certain time while the image is being monitored by the LCD circuit 19, the system control circuit 20 supplies a recording/regenerating control signal to the recording-/regenerating circuit 35. At this time, the recording-/regenerating circuit 35 generates a recording pulse, shown in FIG. 6(a) for a period corresponding to one field, frequency modulates (FM) the video signal supplied from the process circuit 35 during that period and outputs the FM signal onto the magnetic head 36. The video signal corresponding to one field (one frame) is accordingly recorded on one track of the magnetic disk 37, which is rotated by the spindle motor 38 at a speed of 3,600 rpm.

In the case of regenerating the video signal from the magnetic disk 37, the recording/regenerating circuit 35 transmits the regenerated video signal to the LCD circuit 19.

Figure 6A:
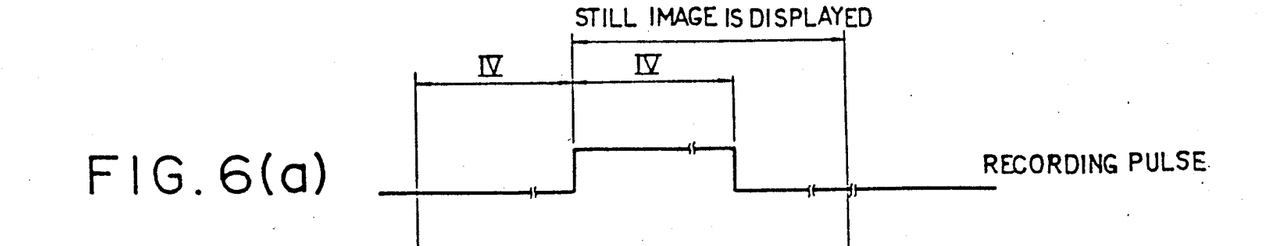
Figure 6B:
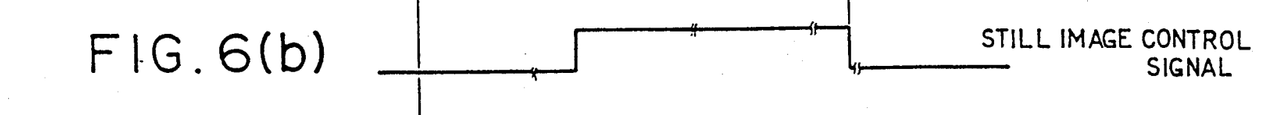

Further, the system control circuit 20 supplies the still image control signal, shown in FIG. 6(b), the LCD circuit 19 synchronously with the recording/regenerating control signal.

Figures 6C, 6D, 6E:
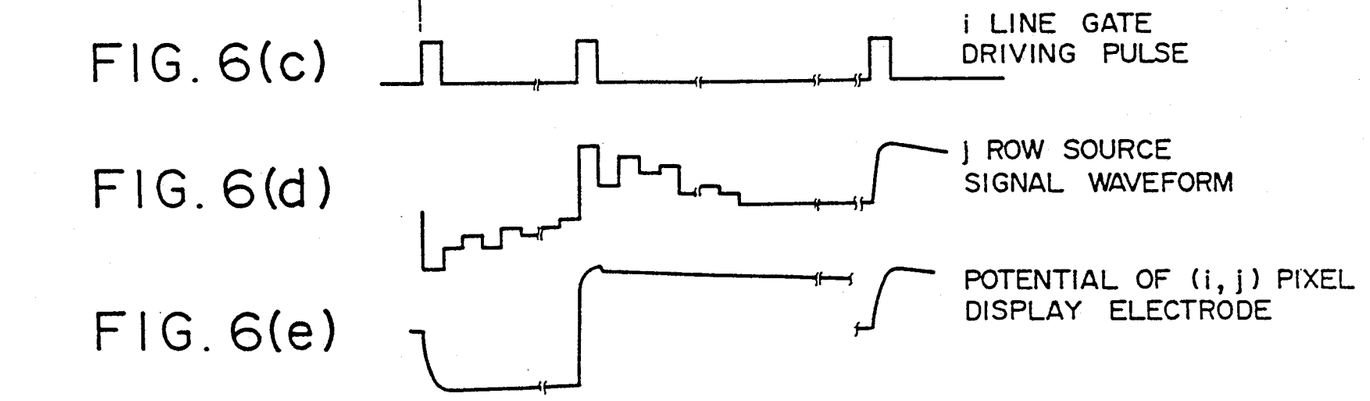
Figure 6F:
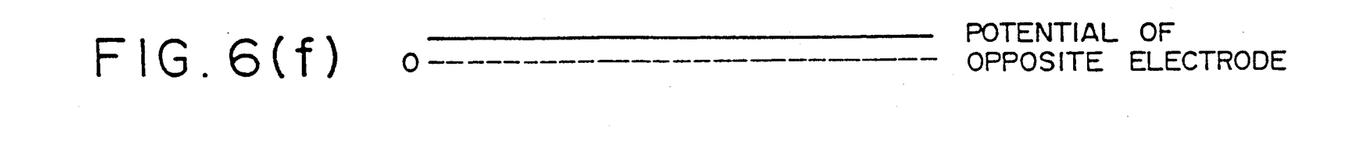

In the LCD circuit 19, the generation of the switching pulse is interrupted, i.e., the supply of the gate drive pulse is interrupted (in other words, the TFT 5 switching elements are kept in the OFF condition, as shown in FIG. 6(c), while the still image control signal is being supplied, as shown in FIG. 6(b). The video signal supplied to the source bus 14 of the j-th row, as shown in FIG. 6(d), is sampled and held in the field immediately after the operating switch 39 is operated, as shown in FIG. 6(e). FIG. 6(f) shows the potential of the capacitor reference electrode.

This holding condition is continued until the still image control signal is released. As a result, the photographed image is displayed on the LCD circuit 19 as a still image during that time, whereby the user is able to confirm the image thus photographed without any additional operations.

Note that, from the point in time when the still image control signal has become OFF till the next switching pulse is supplied to the gate buses 12, no video signal is sampled and capacitors 6 keep holding the accumulated charge (which is discharged spontaneously).

The present invention is applicable to not only interlaced scanning, as above, but also to line sequential scanning.

As set forth above, the supply of the switching pulse to the active matrix LCD is inhibited for a predetermined time, and a still image is obtainable using a simple construction that is low in cost and does not require using a field memory, frame memory or the like.

As the supply of the switching pulse is inhibited for a predetermined period of time during which the recording operation is performed to have a still image displayed on the liquid crystal display, the image that is actually recorded can be monitored without an additional operation. Moreover, an advantages is obtained from the present invention if it is applied to a portable video signal recording/regenerating device that uses batteries, because not only is wear of the magnetic disk, head or the like reduced, but also the electrical power consumption of the device is minimized.

What is claimed is:

1. A liquid crystal display device for receiving video signal and displaying a visual image, comprising:
    an active matrix liquid crystal display member having a plurality of display elements and a plurality of switching elements:
    means for supplying, based upon said video signal, a drive signal to said display elements through respective ones of said switching elements;
    control means for keeping said switching elements in an OFF condition for a predetermined period of time so that the supply of said drive signal to said display elements is interrupted, whereby a still image is displayed for said predetermined period of time without the need to apply another video signal to said display member.

2. The liquid crystal display device according to claim 1, wherein said video signal comprises an image signal, a horizontal synchronous signal, and a vertical synchronous signal, and wherein said drive signal supplying means comprises:
    first driving means for supplying said drive signal to said display elements through respective ones of said switching elements according to said image signal and said vertical synchronous signal included in said video signal; and
    second driving means for supplying a switching signal to respective ones of said switching elements according to said horizontal synchronous signal included in said video signal, where said control means comprises means for inhibiting said second driving means form supplying said switching signals, and wherein said control means drives said inhibiting means for said predetermined period of time.

3. The liquid crystal display device according to claim 1, wherein the display member comprises a plurality of capacitive means connected to respective ones of said display elements for holding a charge applied to respective ones of said display elements for said predetermined period of time.

4. The liquid crystal displaying device according to claim 1, wherein said display elements are capable of holding charges to maintain said image to be displayed for at least said predetermined period of time.

5. A video signal processing device, comprising:
   means for photographing an object and converting an image of said object into a video signal, said video signal comprising an image signal, a horizontal synchronous signal, and a vertical synchronous signal;
   an active matrix liquid crystal display member having a plurality of display elements and a plurality of switching elements;
   means for supplying, based upon said video signal, a drive signal to said display elements though respective ones of said switching elements;
   control means for keeping said switching elements in an OFF condition for a predetermined period of time so that the supply of said drive signal to said display elements is interrupted, whereby a visual still image is displayed for said predetermined period of time without the need to apply another video signal to said display member.

6. The liquid crystal displaying device according to claim 5, wherein said drive signal supplying means comprises:
   first driving means for supplying said drive signal to said display elements through respective ones of said switching elements according to said image signal and said vertical synchronous signal included in said video signal; and
   second driving means for supplying a switching signal to respective ones of said switching elements according to said horizontal synchronous signal included in said video signal, wherein said control means comprise means for inhibiting said second driving means from supplying said switching signal, and wherein said control means drives said inhibiting means for said predetermined period of time.

7. The video signal processing device according to claim 6, further comprising means for recording said video signal on a recording medium.

8. The video signal processing device according to claim 7, further comprising means for regenerating said video signal that has been recorded on said recording medium.

9. The video signal processing device according to claim 7, wherein said recording means comprises switch means for starting said recording of said video signal, and wherein said control means drives said inhibiting means when said switch means is operated.

10. The liquid crystal display device according to claim 5, wherein said display member comprises a plurality of capacitive means connected to respective ones of said display elements for holding a charge applied to respective ones of said display elements for said predetermined period of time.

11. The video signal processing device according to claim 10, wherein said capacitive means are capable of holding charges to maintain the image to be displayed on said display member for at least said predetermined period of time.

12. The video signal processing device according to claim 5, wherein said display member is capable of holding charges to maintain the image to be displayed on said display member for at least one predetermined period of time.

* * * * *

UNITED STATES PATENT AND TRADEMARK OFFICE
CERTIFICATE OF CORRECTION

PATENT NO. : 5,070,409
DATED : December 3, 1991
INVENTOR(S) : S. MIYADERA et al.

It is certified that error appears in the above-identified patent and that said Letters Patent is hereby corrected as shown below:

At column 7, line 24 (claim 6, line 1) of the printed patent, "liquid crystal displaying device" should be changed to ---video signal processing device---.

At column 8, line 18 (claim 10, line 1) of the printed patent, "liquid crystal display device" should be changed to ---video signal processing device---.

Signed and Sealed this

Twenty-fifth Day of May, 1999

Attest:

Q. TODD DICKINSON

*Attesting Officer*          *Acting Commissioner of Patents and Trademarks*